United States Patent
McCoy et al.

(10) Patent No.: US 9,515,838 B2
(45) Date of Patent: Dec. 6, 2016

(54) BANDWIDTH ADAPTIVE COMMUNICATION EVENT SCHEDULING

(71) Applicant: Bank of America Corporation, Charlotte, NC (US)

(72) Inventors: David C. McCoy, Charlotte, NC (US); Russell Lewis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 78 days.

(21) Appl. No.: 14/566,964

(22) Filed: Dec. 11, 2014

(65) Prior Publication Data

US 2016/0173292 A1    Jun. 16, 2016

(51) Int. Cl.
| | |
|---|---|
| *H04N 7/14* | (2006.01) |
| *H04L 12/18* | (2006.01) |
| *H04N 7/15* | (2006.01) |
| *H04L 29/06* | (2006.01) |
| *H04L 12/801* | (2013.01) |

(52) U.S. Cl.
CPC ........... *H04L 12/1827* (2013.01); *H04L 65/80* (2013.01); *H04N 7/15* (2013.01); *H04L 47/127* (2013.01)

(58) Field of Classification Search
CPC .............................. H04M 3/56–3/569; H04M 2203/50–2203/509; H04L 12/1827; H04L 47/127; H04L 65/80

USPC ................... 348/14.01–14.16; 370/259–271, 370/351–357; 379/201.01–201.05, 379/202.01–207.01, 221.15; 709/201–207, 709/217–248

See application file for complete search history.

(56) References Cited

U.S. PATENT DOCUMENTS

| | | | | |
|---|---|---|---|---|
| 6,411,605 | B1 * | 6/2002 | Vance | H04L 12/24 370/261 |
| 6,870,916 | B2 * | 3/2005 | Henrikson | H04M 3/567 379/158 |
| 6,876,734 | B1 * | 4/2005 | Summers | H04L 12/1818 370/260 |
| 7,213,050 | B1 * | 5/2007 | Shaffer | H04L 12/1813 370/261 |
| 7,483,945 | B2 * | 1/2009 | Blumofe | H04L 12/1818 379/201.12 |
| 8,990,314 | B2 * | 3/2015 | Rosenberg | G06Q 10/10 709/206 |
| 2004/0199580 | A1 * | 10/2004 | Zhakov | H04L 12/1818 709/204 |
| 2010/0328421 | A1 * | 12/2010 | Khot | H04N 7/15 348/14.08 |

* cited by examiner

*Primary Examiner* — Hemant Patel
(74) *Attorney, Agent, or Firm* — Banner & Witcoff, Ltd.; Michael A. Springs

(57) ABSTRACT

Aspects of the disclosure relate to a bandwidth adaptive communication event scheduling system. The system can provide an availability recommendation for a communication event based on bandwidth usage. A user can request to schedule a communication event at a future time based on the availability recommendation, and the system can determine whether to approve or deny the request based the details of the request and predicted or real-time bandwidth usage.

20 Claims, 7 Drawing Sheets

BANDWIDTH ADAPTIVE COMMUNICATION EVENT SCHEDULING

BACKGROUND

With the advent of computer networks and the internet, many traditional forms of communication can take place over computer networks and the internet including written, audio, and visual forms of communication. In order for the communication to occur, bandwidth is needed to transfer communication data from the source to its destination. Because some forms of communication and other network activities may be more bandwidth intensive than others, it may be difficult for all data traffic to be transmitted in a timely manner over a communication network when too many bandwidth intensive activities are occurring at the same time.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, apparatuses, and non-transitory computer-readable media of the bandwidth adaptive communication event scheduling system. The bandwidth adaptive communication event scheduling system enables the management of communication event activities (e.g., video conferences) across networks. A first computing device may determine an availability recommendation for a plurality of time periods for a communication event based on scheduled communication events of other users. A request to initiate scheduling of a communication event between a first user of a second computing device and a second user may be received from the second computing device. The availability recommendation may be transmitted to the second computing device in response to the request. A request to schedule a communication event between the first user and the second user based on the availability recommendation may be received from the second computing device, and the request may include communication event information. The first computing device can determine whether to approve scheduling of the communication event based on the communication event information, network conditions, and the scheduled communication events of other users. In response to determining to approve scheduling of the communication event based on the communication event information, an indication that scheduling of the communication event is approved may be provided to the second computing device.

In some aspects, the availability recommendation may be provided to the user in the form of a calendar with labels for time periods in which video conferencing is still available and for time periods in which video conferencing is no longer available. In yet another aspect, a dashboard containing real-time availability information for video conferencing may be provided. From the dashboard, a user may be able to observe real-time availability and directly schedule or reserve bandwidth for a real-time video conference if real-time capacity is available.

In some aspects, a user such as a system administrator may access an administration console to configure settings for bandwidth allocated to video conference traffic and non-video conference traffic.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Aspects described herein relate to a system that schedules a communication event (e.g., video conference or chat) based on network conditions such as available bandwidth and various other parameters in order to protect the network from being overwhelmed with concurrent video conferences and to dedicate a portion of the bandwidth for core functions (e.g., non-video conference traffic). Aspects described herein further enable bandwidth management of different types of traffic and increase the ease of scheduling a communication event and the service quality of the communication event.

Figure 1:
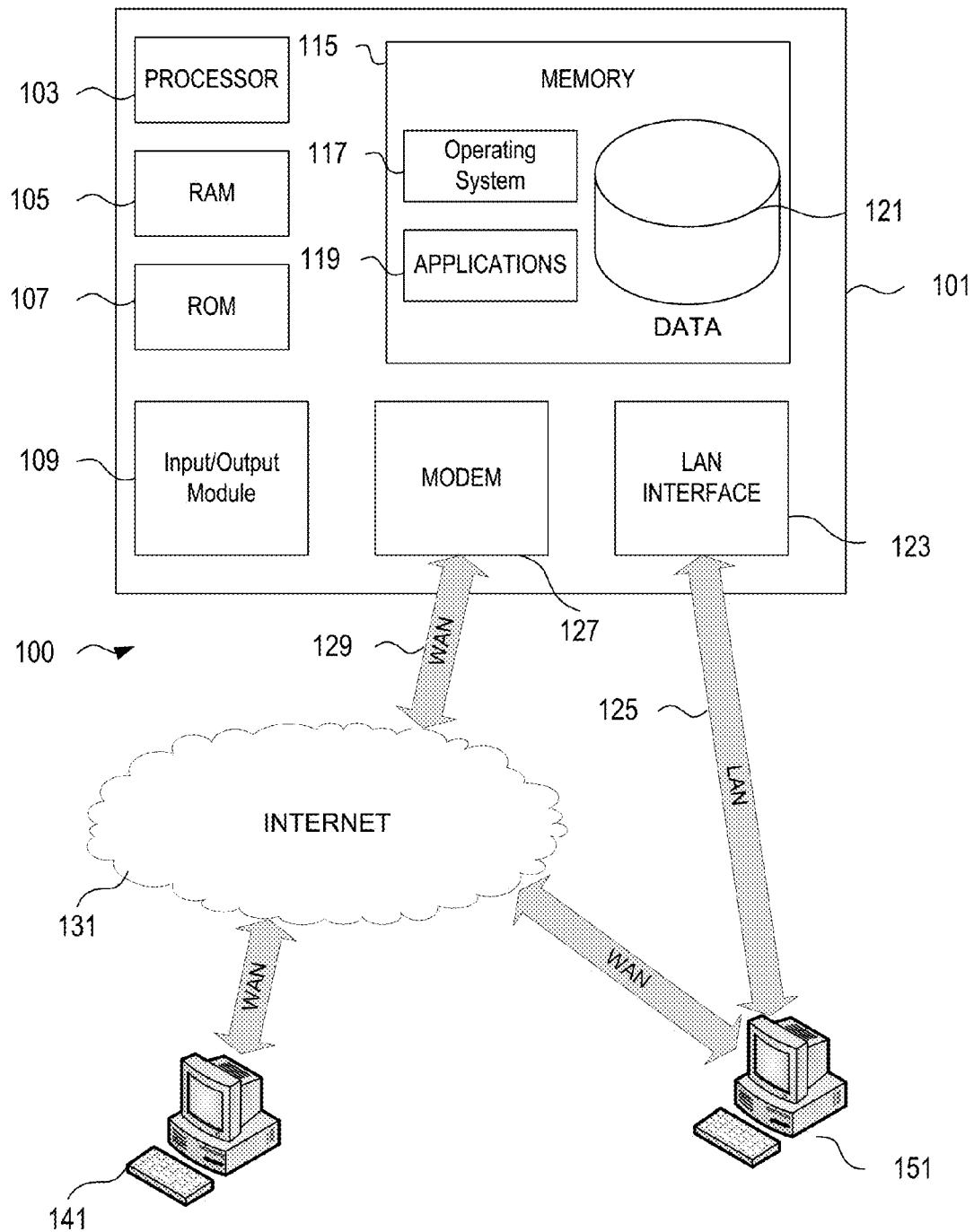
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
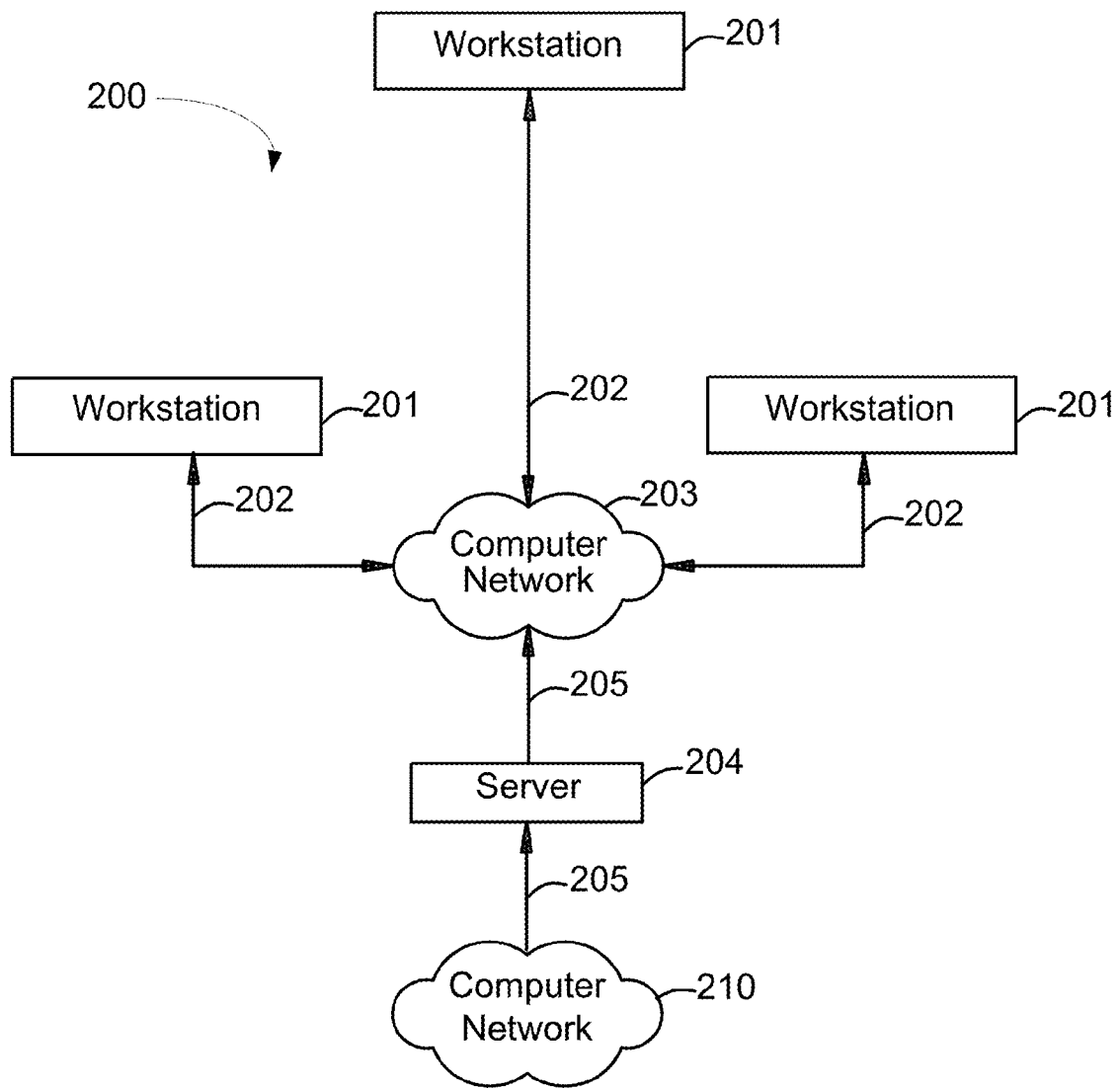
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
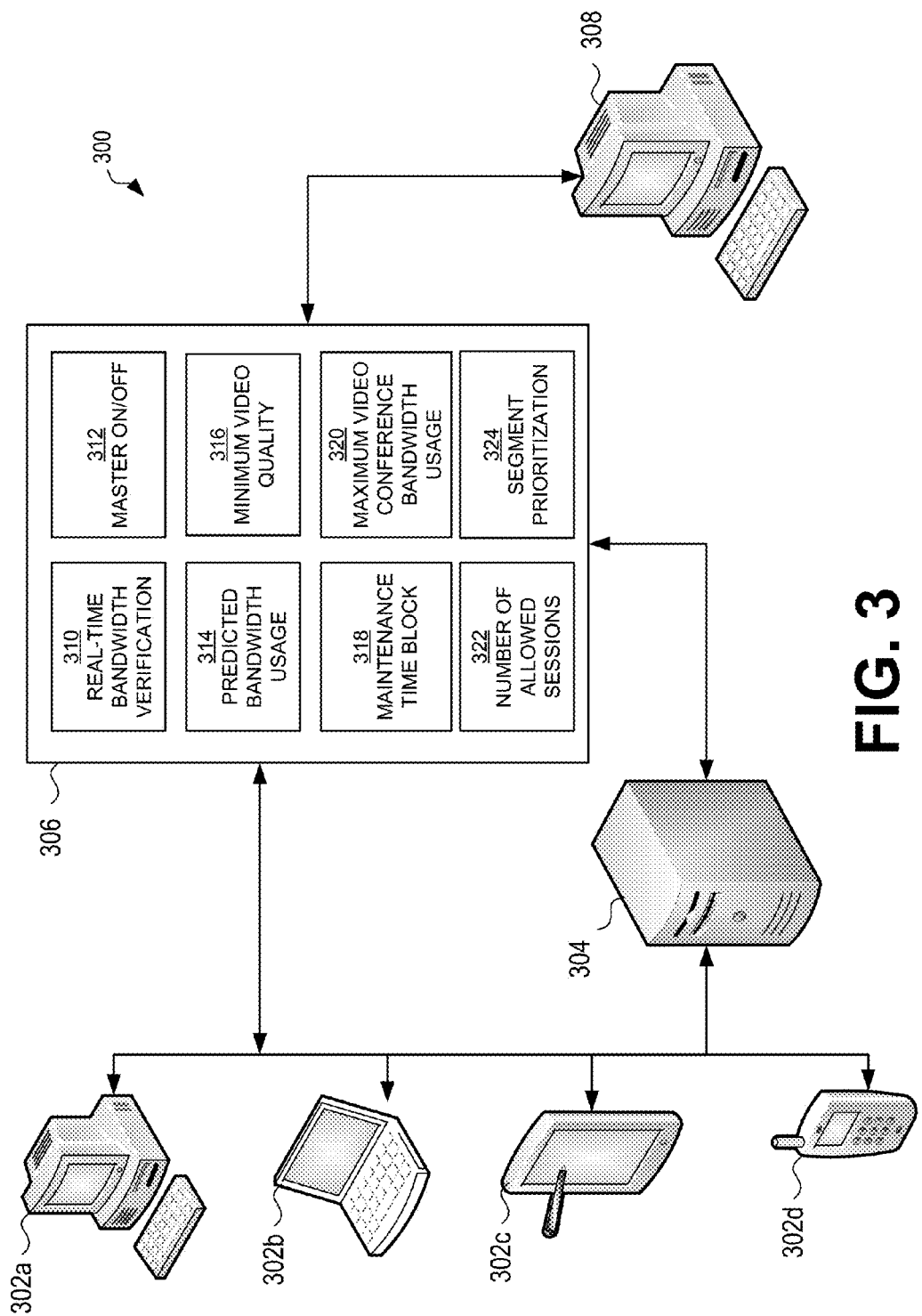
FIG. 3 is an illustrative system diagram according to aspects described herein.

FIG. 3 shows an illustrative bandwidth adaptive communication event scheduling system 300 including workstations 302, a schedule server 304, a master video controller 306, and an administration console 308. The communication event may be a video conference or chat which may involve an audiovisual communication between two or more users with at least two computing devices acting as sources of audiovisual communication data. Workstations 302 may be computing devices (e.g., a desktop computer, a smartphone, a wireless device, a tablet computer, a laptop computer, and the like) with a camera sensor which can be used to participate in video chats or conferences. Workstations 302 may be used by users to access the schedule server 304 and/or master video controller 306 to schedule communication events. For example, the video conference may be scheduled to occur at a future time as a meeting or appointment between two or more users or the video conference may be real-time video conference. The video conference availability may be presented as the schedule availability of a person or user in the system, and the meeting may be scheduled based on the availability of one or more of the users and the video conference user. The schedule server 304 may provide information about availability for a communication event meeting based on the availability represented by the video conference user. For example, the schedule server 304 may be an e-mail and/or calendar server (e.g., Microsoft Exchange server). Schedule server 304 may be connected to master video controller 306 which provides the availability of the video conference user to schedule server 304. An example of a user interface for scheduling a video conference session is shown in and will be described with respect to FIG. 6.

Master video controller 306 may determine availability for video conferences based on a variety of factors. The factors may include real-time bandwidth availability, master on/off switch, predicted bandwidth usage, minimum video quality, maintenance time blockage, maximum video conference bandwidth usage, number of allowed sessions, and segment prioritization, and data or information of the factors may be provided by modules of master video controller 306. A real-time bandwidth verification module 310 may provide data or information on current or real-time bandwidth usage including, for example, real-time video conference traffic, real-time core (non-video conference) traffic, and latency. The usage may be provided for an entire network and/or broken down for different groups of workstations (e.g., workstations located at the same office location, workstations connected to the same network or sub-network, workstations connected to the same router, workstations connected to the same access point). The traffic information may be provided in terms of percentages of total bandwidth capacity. For example, 40% of the bandwidth usage for data traffic to and from workstations located at an office location out of the total capacity for the office location may be video conference traffic, and 25% of the bandwidth usage for data traffic to and from the workstations may be core traffic. Core (non-video conference) traffic may be data traffic related to general internet usage such as email messages, web browsing, accessing storage servers, instant messages, video streaming, etc.

A master on/off switch 312 may be used to disable the video conferencing system such that all active video conferences are disabled and no new video conferences are able to start.

A predicted bandwidth usage module 314 may determine whether video conferencing is available based on scheduled video conferences of other users and data provided by other modules such as minimum video quality 316, maximum video conference bandwidth usage 320, number of allowed connections 322, and segment prioritization 324, and predicted bandwidth usage module 314 will be described in more detail herein with respect to FIG. 5A.

Minimum video quality module 316 may enable a user such as a system administrator to set or control the minimum video quality to be provided for each video conference. For example, the administrator may set the minimum video quality to be standard definition (SD) for each video conference connection or set the minimum video quality as a bit rate of kilobits per second (kbps). A different minimum video quality may be specified for each customer category (e.g., Level A, Level B, etc.) as discussed herein, for example, with respect to segment prioritization 324. The administrator may further specify different minimum video quality for different periods of time.

Maintenance time block module 318 may be used by a user such as the system administrator to disable or block video conferencing for different time periods to allow for maintenance on the video conferencing system. Maintenance time block module 318 may have a setting to only disable starting new video conference sessions during the blocked time period. In other words, ongoing or active video conferences may continue to function whereas requests to start new video conferences during the blocked time period may be denied. Maintenance time block module 318 may be used to disable or block video conferencing for different groups of users. For example, the maintenance time block may be set for all users located in a local area or at a local level (e.g., branch office) or in a particular geographic region or regional level (e.g., east coast, west coast, northeast, south, midwest, etc.).

Maximum video conference bandwidth usage 320 may define the maximum bandwidth over a network or a workstation group that can be used for video conferences. Maximum video conference bandwidth usage may be specified in terms of percentages. A network may have a total available bandwidth of 100 megabits per second (Mbps), and video conference may be allowed to use up to 30 Mbps. The system administrator may set the maximum video conference bandwidth usage to 30% or set it in terms of data rate at 30 Mbps. The system administrator may further specify of the 30% what percentage can be used for upload traffic (e.g., data traffic from a workstation to a remote computing device) or download traffic (e.g., data traffic from the remote computing device to the workstation). The maximum bandwidth usage 320 may be different for different periods of time. For example, peak core traffic may occur in a given period of time (e.g., morning, afternoon, etc.), and a system administrator may reduce the maximum bandwidth usage and/or lower the minimum video quality to shift more bandwidth availability to core traffic during the given period of time. The system administrator may assign different maximum bandwidth usage for different groups of users. For example, a specified maximum bandwidth usage may apply to all users located in a local area or at a local level (e.g., branch office) or in a particular geographic region or at a regional level (e.g., east coast, west coast, northeast, south, midwest, etc.).

Number of allowed sessions module 322 may be used by the system administrator to set the number of concurrent video conference sessions allowed during a certain time period. The number of allowed sessions may be set per workstation group. For example, a first workstation group of 45 workstations may be limited to 15 concurrent active video conference sessions. In other words, up to 15 workstations out of the 45 workstations can be participating in a video conference at any given time. A 16th workstation might not be allowed to start a video conference session while the 15 workstations are still in a video conference session. In some instances, a scheduled video conference may run longer than the scheduled time period and another scheduled video conference may be beginning such that 16 workstations would be participating in a video conference. In this instance, the 16th workstation may be allowed to begin its previously scheduled video conference session provided that the system can still maintain the minimum video quality for all video conferences, and the video conference bandwidth usage can be below the maximum video conference bandwidth usage 320. The system administrator may specify a different number of allowed sessions for different groups of users. For example, a set number of allowed sessions may apply to all users located in a local area or at a local level (e.g., branch office) or in a particular geographic region or at a regional level (e.g., east coast, west coast, northeast, south, midwest, etc.).

Segment prioritization module 324 allows the system to prioritize individual video conference sessions based on the users participating in the video conference. The user of scheduling system 300 may be video conferencing with a customer of the user's organization. Based on the customer's priority category, the video conference session with the customer as a participant may be prioritized for quality. For example, the customer may be a VIP customer and categorized as a level A customer, or the customer may have purchased special access and be categorized as a level B customer. Level A may be the highest level, and for the level A customer, an amount of bandwidth may be reserved or allocated to the video conference connection with the level A customer to ensure that the level A customer always receives the highest supported video and audio quality, for example, high-definition (HD) video quality. The reserved or allocated bandwidth may be upload bandwidth or bandwidth for data transmitted from the user to the level A customer. In setting up the video conference, the user may select the customer from a pre-loaded database which has already assigned a priority category to each customer, for example, when the customer signs up for service.

In some aspects, the system can adjust the quality of video for the video conference depending on the bandwidth available over the connection. The bandwidth available may depend on traffic of other users over the network and the type of network being used by all of the devices participating in the video conference session. For example, one of the users may be using a cellular network connection for video conference which may have less bandwidth than a wireline network connection that the second user is using. The system can adjust to the more limiting network connection by providing a lower quality video. In the event more bandwidth becomes available, the system can increase the video quality.

A system administrator can access an administration console to configure the settings of the master video controller 306. The system administrator can set the master on/off 312, minimum video quality 316, maintenance time block 318, maximum video conference bandwidth usage 320, number of allowed sessions 322, and segment prioritization 324 via the administration console. A local version of the administration console may be provided to an administrator of a workstation group, for example, the administrator of an office. Via the local administration console, the administrator can configure some or all of the same settings to be specific to the workstation group.

Figure 4:
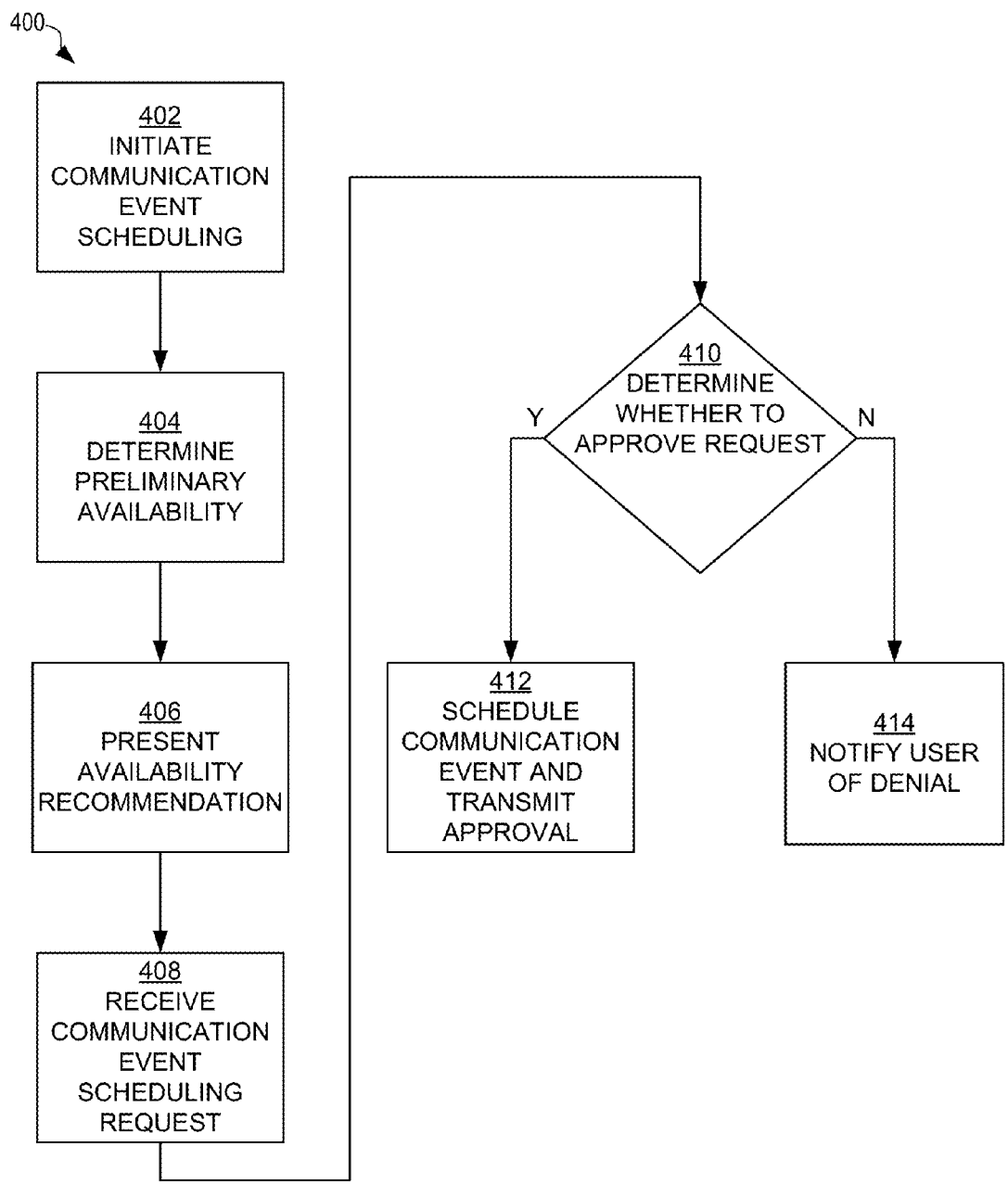
FIG. 4 is an illustrative method of scheduling a communication event based on bandwidth capacity availability according to aspects described herein.

FIG. 4 shows an illustrative method of scheduling a communication event based on bandwidth capacity availability 400 according to aspects described herein. At step 402, a user of a workstation may initiate communication event scheduling. For example, the user can begin by creating a meeting or appointment request between the user and one or more other users for a video conference. The user's workstation may send a request to retrieve or access an availability recommendation for video conferencing, for example, by adding a video conference user to the meeting request. As discussed herein, the video conference user might not be an actual user but can represent resource availability for video conferences. At step 404, the system may determine a preliminary availability and provide an availability recommendation for video conferencing for a plurality of time periods. For example, master video controller 306 can provide an availability recommendation to schedule server 304. The availability recommendation may be based on an availability stored in master video controller 306 and updated periodically or aperiodically (e.g., after each approved meeting request) as will be described herein with respect to FIG. 5B. The time periods may be in time increments of, for example, 1 hour, 30 minutes, 15 minutes, etc. The availability may be shown in blocks of, for example, 30 minutes of time.

Figure 6:
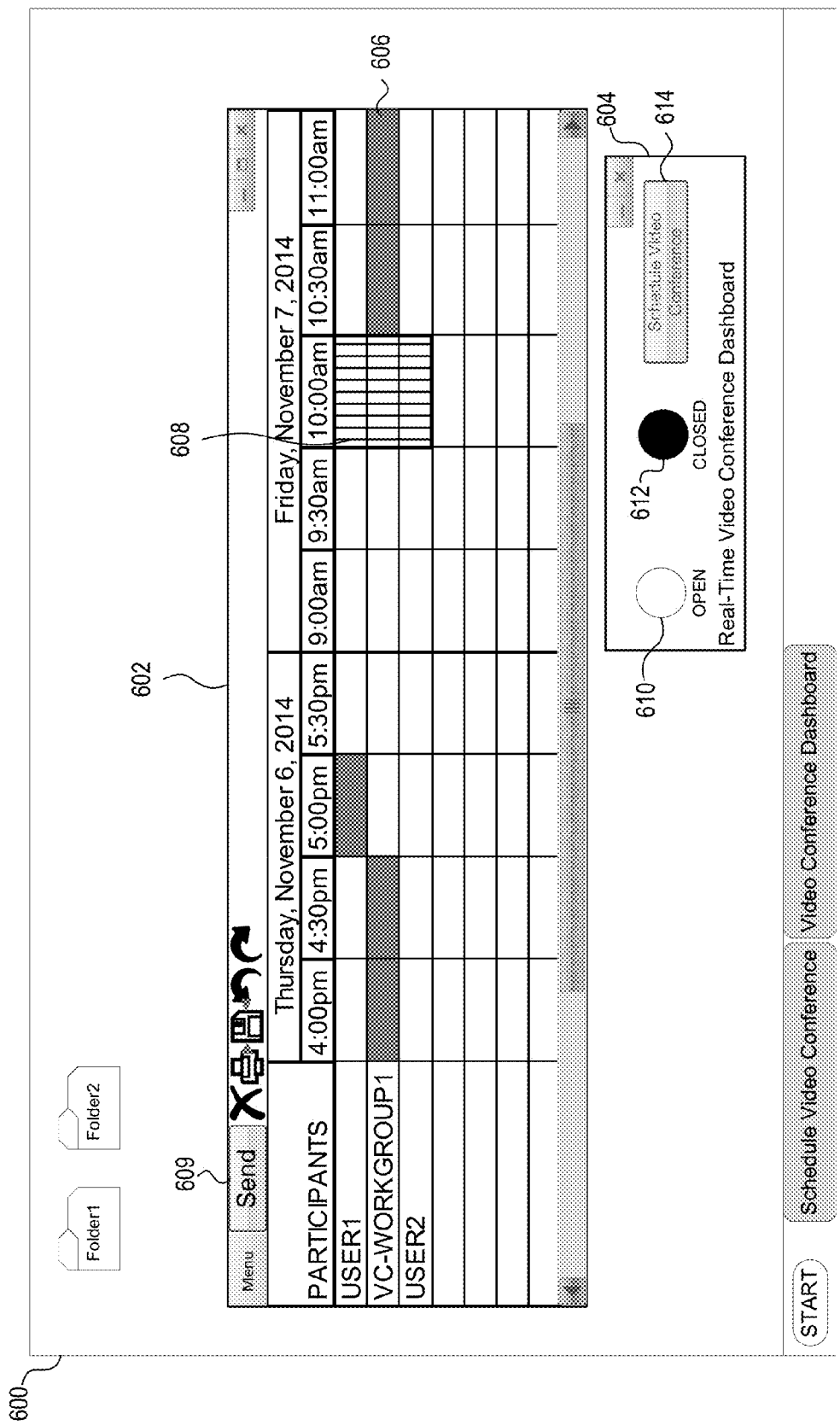
FIG. 6 shows an illustrative workstation desktop including a video conference scheduling request and a real-time video conference status dashboard according to aspects described herein.

At step 406, the workstation can receive the availability of the video conferencing system for the user in response to the request and present the availability to the user. The availability may be presented to the user in the form of a calendar with indicators or labels for various time periods in which the video conferencing system is unavailable and/or available, for example, as shown in FIG. 6 which will be described in more detail herein. The availability recommendation may depend on the user and the activities of other users in the user's workstation group and thus different availability recommendations may be presented to different users. For example, different video conference users may be associated with different workstation groups, and the video conference user associated with the workstation group may represent the availability of video conferencing to users of the workstation group.

Based on the presented availability recommendation, the user can select open or available time periods on the schedule of the video conference user for the user's proposed video conference time. In some aspects, the availability of the video conference user may be combined with the user's availability such that any time period that the user is unavailable and/or the video conference user would be unavailable may be shown as unavailable on the user's schedule. The user can send a video conference scheduling request to master video controller 306 to obtain approval for scheduling a video conference during the requested time period based on details of the video conference. The details of the video conference can, for example, at least include information about the user initiating the video conference, the other participant(s) of the video conference, and the time and date of the proposed video conference. The request may be received from the user's workstation at the schedule server 304, and the schedule server 304 may send the request to the master video controller 306 before confirming scheduling of the video conference to the user.

At step 410, master video controller 306 may determine whether to approve the request which will be described in more detail with respect to FIG. 5A. At step 412, schedule server 304 may schedule the requested video conference and transmit confirmation that the video conference has been scheduled in response to receiving approval from master video controller 306. If master video controller denies the request in step 410, schedule server 304 may transmit a message to the user notifying the user that the video conference request has been denied. The user can modify the request to propose a different time and/or date for the video conference and re-send the request. The re-sent request may be evaluated according to steps 408-410.

Figure 5A:
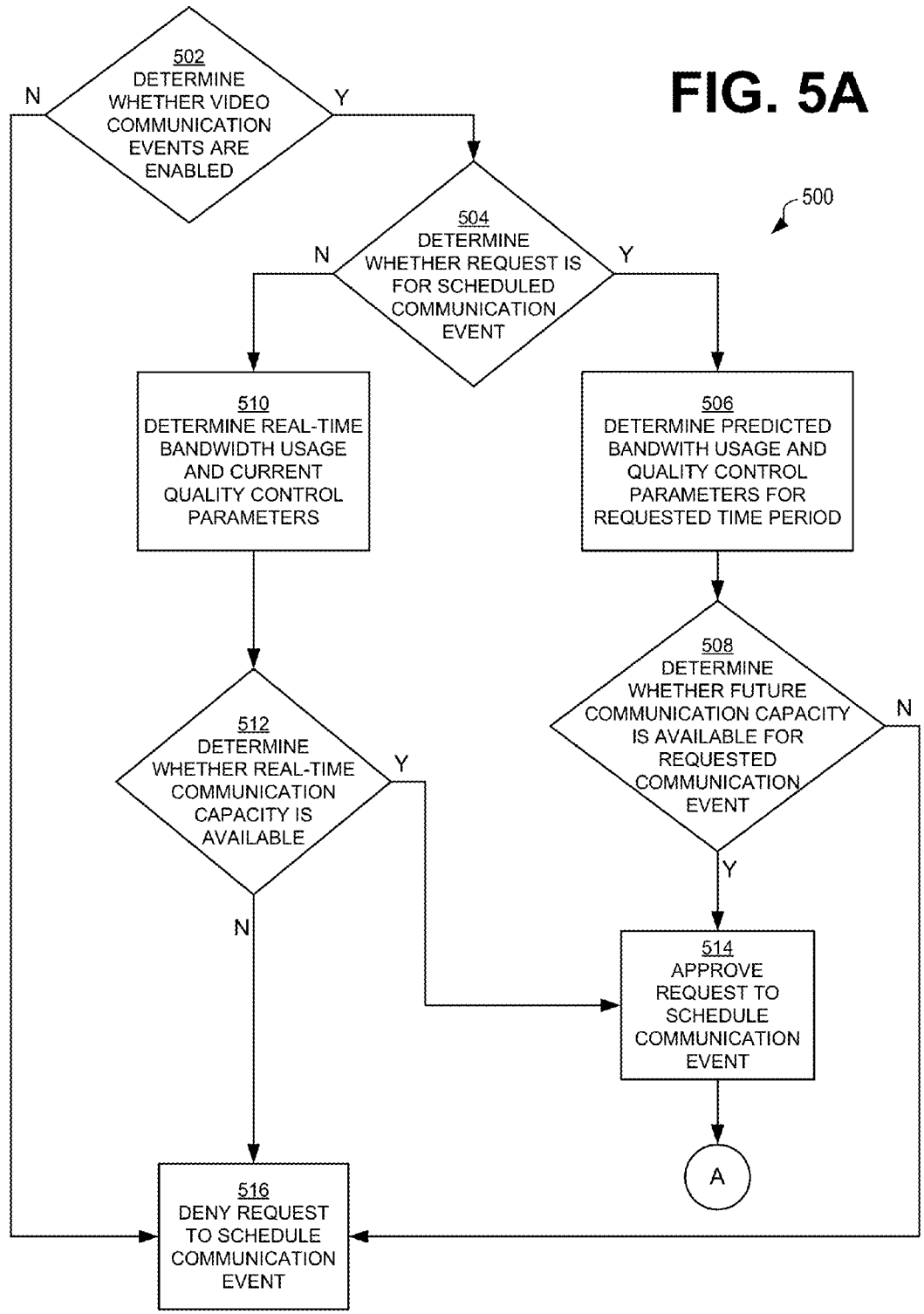
FIGS. 5A-5B is an illustrative method for determining whether to approve a request to schedule a communication event and update an availability recommendation according to aspects described herein.
Figure 5B:
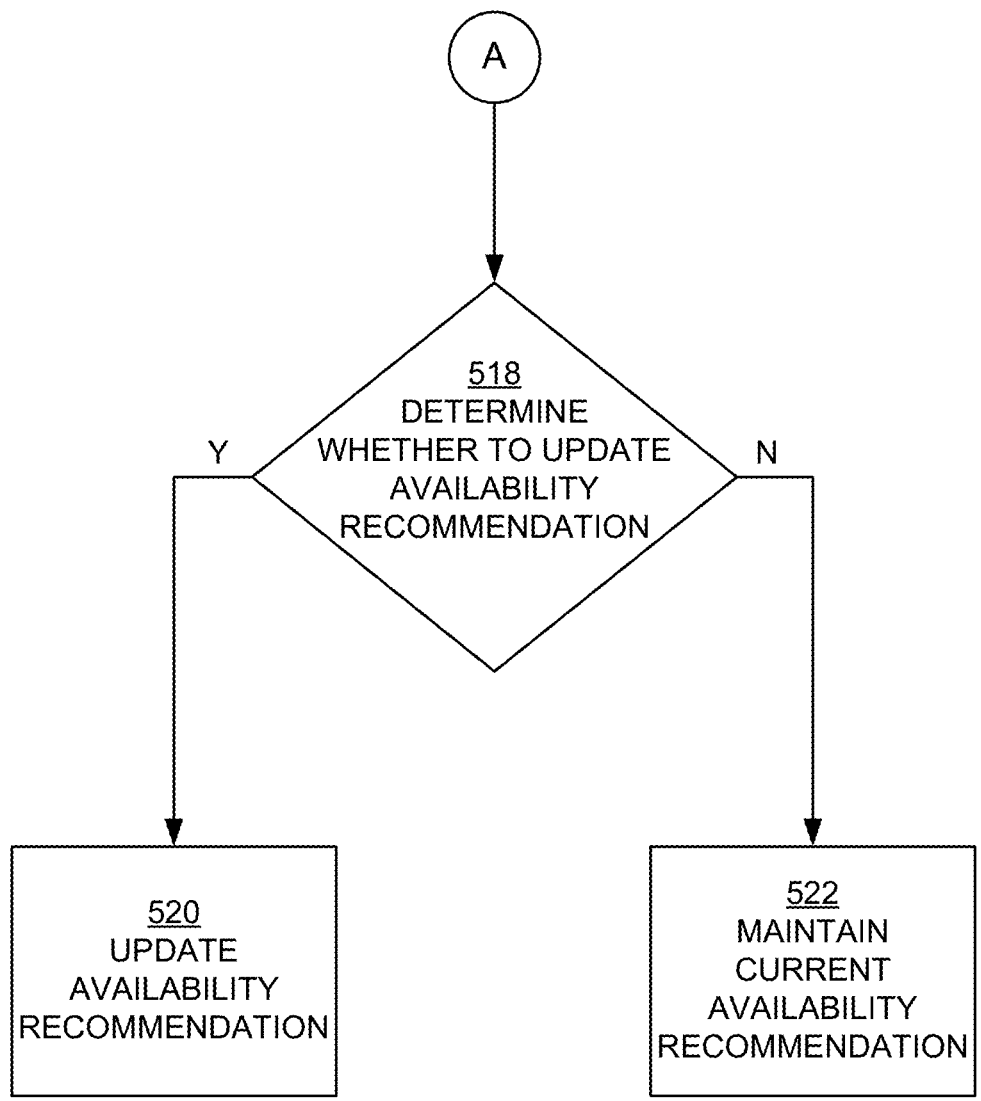

FIGS. 5A-5B show an illustrative method for determining whether to approve a request to schedule a communication event and update an availability recommendation according to aspects described herein. At step 502, master video controller server 306 may evaluate the request received from schedule server 304 with respect to whether video communication events are enabled or disabled for the requested time period. Master video controller server 306 may base this evaluation on master on/off switch 312 and maintenance time block module 318. For example, master on/off switch 312 may have disabled video conferencing such that all requests received while the video conference system is disabled are denied. If video conferencing is not disabled by master on/off 312, master video controller 306 may determine whether a maintenance time block is present during the requested time period using maintenance time block module 318. Master video controller 306 may compare the time period in the request with blocked time periods. If a blocked time period overlaps with the request time period, master video controller 306 may deny the request. For example, a maintenance time block may be present from 2 pm-4 pm and the request may be for a video conference between 3:30 pm and 4:30 pm. Master controller 306 may deny such a video conference request. According to another aspect, if the requested time period begins outside of the blocked time period, master video controller 306 may allow the request even though the video conference may be scheduled to end during the blocked time period. For example, if the last five minutes of the requested time period are scheduled to be within a maintenance time block, master video controller may still allow the request. A setting may be present in the maintenance time block module to allow requests with the last x number of minutes being within the maintenance time block.

At step 504, master video controller server 306 can determine whether the request is for a scheduled video conference. For example, for the requested time in the video conference request, the request may indicate real-time or the current time for a real-time video conference and provide a specific start time and end time in the future and/or a future date for a scheduled video conference. If the request is for a scheduled video conference, master video controller server 306 may proceed to step 506. If the request is not for a scheduled video conference, the master video controller 306 can determine that the request is for a real-time video conference and proceed to step 510.

At step 506, master video controller 306 may determine the predicted bandwidth usage and quality control parameters for the requested time period. For example, master video controller 306 may use the number of allowed sessions 322 to identify the number of allowed sessions set for the requested time period and use minimum video quality 316 and maximum video conference bandwidth usage to, respectively, determine the minimum video quality and maximum video conference bandwidth usage set for the requested time period.

At step 508, master video controller 306 may determine whether future communication capacity is available for the requested communication event. Predicted bandwidth usage module 314 can access video conference schedule data for the video conference user included in the request and determine the number of video conference sessions currently scheduled during the requested time period based on the number of scheduled conferences in which the video conference user is a participant. If adding another video conference session anytime during the requested time period would not increase the number of concurrent or overlapping sessions beyond the number of allowed sessions 322, predicted bandwidth usage module 314 may evaluate whether allowing the requested video conference would still allow the system 300 to meet the minimum video quality and maximum video conference bandwidth usage requirements. Predicted bandwidth usage 314 can estimate the needed bandwidth for each video conference session scheduled during the requested time period and for the requested video conference session to meet the minimum video quality set. The estimated bandwidth needed for the requested video conference can take into account a larger amount of bandwidth being needed for a higher quality session with a prioritized user as determined by segment prioritization 324.

Based on the estimated total bandwidth needed for all of the scheduled video conference sessions and the requested video conference session, predicted bandwidth usage module 314 can compare the estimate to the maximum video conference bandwidth usage allowed during the requested time period. If the estimated total bandwidth needed is less than or equal to the maximum 320, then predicted bandwidth usage module 314 may determine that capacity is available for the requested video conference. If the estimated total bandwidth needed is more than the maximum 320, then predicted bandwidth usage module 314 can determine that capacity is not available for the requested video conference.

If master video controller 306 determines that sufficient capacity is available for the requested communication event in step 508, master video controller 306 can indicate to schedule server 304 that the requested video conference meeting is approved in step 514. If master video controller 306 determines that there is insufficient capacity for the requested communication event in step 514, master video controller 306 can transmit a denial message to scheduling server 304 in step 516.

Returning to step 510 and determining whether to approve a request for a real-time video conference meeting, master video controller 306 can determine real-time bandwidth usage and current quality control parameters. At step 512, master video controller 306 can determine whether the number of allowed sessions allows for starting a real-time video conference and determine real-time bandwidth usage with real-time bandwidth verification 310 and estimate bandwidth required for the requested real-time video conference. For determining whether the number of allowed sessions allows for starting a real-time video conference, master video controller 306 can consider any scheduled video conferences which may be beginning within a predetermined time window (e.g., 5 minutes, 10 minutes, etc.)

from the current time. For example, the number of allowed sessions may allow five concurrent video conferences, and currently, four video conferences may be active with another scheduled video conference due to start in 10 minutes. Even though the current number of active video conferences is below the number of allowed sessions, master video controller 306 may deny the real-time video request.

Continuing with evaluating whether real-time bandwidth capacity is available, similar to step 508, master video controller 306 can compare a total of the real-time bandwidth usage and the estimated bandwidth required for the requested real-time video conference to the maximum bandwidth usage allowed for the current time period. If the total exceeds the maximum bandwidth usage allowed, then master video controller may determine that capacity is not available for the requested real-time video conference and proceed to step 516 to deny the request. If the total does not exceed the maximum bandwidth usage allowed, then master video controller may determine that capacity is available for the real-time video conference and proceed to step 514 to approve the request.

If the video conference request is approved in step 514, master video controller 306 may proceed to step 518 shown in FIG. 5B and determine whether to update the availability recommendation for the requested time period. For example, if the addition of another video conference during the requested time period would increase a total number of video conference sessions to be more than the number of allowed sessions, the time period in which the number of allowed sessions would be exceeded may be changed to be unavailable for the video conference user. Similarly, if the addition of another video conference during the requested time period would cause the system to be unable to meet minimum video quality requirements for the already scheduled video conferences or if the addition of another video conference would cause the system to exceed the maximum bandwidth usage, master video controller 306 may change the time periods in which these occur to unavailable for the video conference user. If master video controller 306 determines in step 518 that the availability for the video conference user for any time periods should be changed, master video controller may proceed to step 520 and update the availability. If no changes should be made, master video controller may proceed to step 522 and maintain the current availability schedule.

Additionally, if master video controller receives a cancellation of a scheduled video conference, master video controller may change any time periods during the cancelled video conference which were unavailable to available.

In some aspects, master video controller 306 may continuously monitor whether capacity is available and provide the availability information to the user in form of a real-time availability dashboard. Via the availability dashboard, the user may initiate setting up a real-time video conference. For example, via real-time bandwidth verification module, master controller 306 can monitor real-time video conference bandwidth usage and compare the real-time bandwidth usage to the video conference bandwidth parameters such as the maximum video conference bandwidth usage 320 and number of allowed connections. If these parameters are exceeded, master video controller can determine that capacity for a real-time video conference is no longer available.

While the steps of the methods described herein have been described in an order, the order of the steps are illustrative, and the steps may be re-arranged and performed in a different order.

FIG. 6 shows an illustrative workstation desktop 600 including a video conference scheduling request 602 and a real-time video conference status dashboard 604 according to aspects described herein. FIG. 6 shows scheduling request 602 for a video conference between user 1 and user 2 with the request being scheduled and initiated by user 1. User 1 may be part of workgroup 1, and the video conference user for workgroup 1 VC-WORKGROUP1 is included on the participant list to show the video conferencing availability recommended for the workstation group including user 1 which may be all workstations at the same location. Unavailability indicator 606 may be in the form of a shading on the time periods in which video conferencing is not recommended or unavailable. For example, FIG. 6 shows video conference user for workgroup 1 VC-WORKGROUP1 as being unavailable between 4-5 pm on Thursday, Nov. 6, 2014 and between 10:30-11:30 am on Friday, Nov. 7, 2014. All users including user VC-WORKGROUP1 are available between 10-10:30 am on Friday, Nov. 7, 2014. As shown in FIG. 6, the user has selected 10-10:30 am on Friday, Nov. 7, 2014 for the proposed video conference time which may be represented by a time selection indicator 608 having a shading (e.g., pattern and/or color) different than the shading 606. In FIG. 6, an example shading is shown as stripes. After the user is satisfied with time and users selected for the scheduling request, the user can send the request to schedule server 304 by selecting a "SEND" button 609.

According to another aspect, the user may specify that the meeting to be scheduled is for a video conference, and the system may combine or incorporate the availability of the video conference user into the requesting user's meeting availability. For example, for any time periods that the requesting user User 1 is unavailable and/or the video conference user is unavailable those time periods may appear as unavailable on User 1's availability schedule. In this aspect, user 1 and user 2 may be listed as participants on the scheduling request without the video conference user being separately listed and shown to a user scheduling a video conference. The video conference user's availability may still be individually shown and available to a system administrator on administration console 308.

According to another aspect, a dashboard 604 may be provided dedicated to informing a user of the availability of real-time video conferencing. The dashboard may have two or more indicators providing information on whether capacity is currently available for a real-time video conference. For example, an indicator 610 may notify the user that capacity is available for a real-time video conference. Another indicator 612 may be used to show that there is currently no capacity available for a real-time video conference. If capacity is available for a real-time video conference, a user may select a "SCHEDULE VIDEO CONFERENCE" button 614 on the dashboard 604 to directly request a real-time video conference. The button 614 may be greyed out and disabled when there is no real-time video conference capacity available. Selecting the button 614 may prompt the user for other users to add as participants in the video conference from a list and/or by entry of the email addresses of other users. In another aspect, selecting the button 614 may directly reserve bandwidth for a real-time video conference for the user. Master video controller 306 may update availability of the real-time conference dashboard as described with respect to FIG. 5B.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A method comprising:
   determining, by a first computing device, an availability recommendation for a plurality of time periods for a communication event based on scheduled communication events of other users and bandwidth usage of the other users;
   receiving, from a second computing device, a request to initiate scheduling of a communication event between a first user of the second computing device and a second user;
   transmitting, to the second computing device, the availability recommendation of the plurality of time periods in response to the request;
   receiving, from the second computing device, a request to schedule a communication event between the first user and the second user based on the availability recommendation, the request comprising communication event information;
   determining, by the first computing device, whether to approve scheduling of the communication event between the first user and the second user based on the communication event information and the scheduled communication events of other users, the determining whether to approve scheduling of the communication event including determining whether communication events are enabled;
   in response to determining to approve scheduling of the communication event based on the communication event information:
      determining a time period for the communication event and a customer category of at least one user associated with the communication event;
      based on the determined time period and customer category, determining a minimum video quality for the communication event; and
      providing, to the second computing device, an indication that scheduling of the communication event with the determined video quality is approved.

2. The method of claim 1, wherein the communication event comprises a video conference between the first user and the second user.

3. The method of claim 1, wherein the request comprises a request to schedule a communication event at a future time, and
   wherein determining whether to approve scheduling of the communication event further includes:
      determining, by the first computing device, whether to approve scheduling of the communication event based on the communication event information, predicted network conditions, and scheduled communication events of other users.

4. The method of claim 1, wherein the request comprises a request to schedule a real-time communication event, and
   wherein determining whether to approve scheduling of the communication event further includes:
      determining, by the first computing device, whether to approve scheduling of the communication event at a current time based on real-time network conditions.

5. The method of claim 4, wherein determining whether to approve scheduling of the communication event at the current time further includes determining whether to approve scheduling of the communication event at the current time based on one or more currently active communication events, the real-time network conditions, and scheduled communication events starting within a predetermined time window from the current time.

6. The method of claim 1, wherein determining the availability recommendation comprises:
   for each time period of the plurality of time periods, determining, by the first computing device, the availability recommendation of the time period for a communication event based on at least one of a number of scheduled communication events during a same time period, presence of a maintenance block, and estimated bandwidth usage of scheduled communication events during the same time period.

7. The method of claim 1, wherein the first user is at a first location, and wherein the scheduled communication events of other users comprise scheduled communication events of other users at the first location.

8. The method of claim 7, wherein determining whether to approve scheduling of the communication event between the first user and the second user further includes:
   determining whether to approve scheduling of the communication event between the first user and the second user based on the communication event information, the scheduled communication events of other users, and network conditions of a network at the first location.

9. An apparatus, comprising:
   at least one processor; and
   a memory storing computer-readable instructions that, when executed by the at least one processor, cause the apparatus to:
      receive an input from a user of the apparatus requesting to view an availability recommendation of a plurality of time periods for a communication event based on scheduled communication events of other users and bandwidth usage of the other users;
      transmit, to a second apparatus, a request to initiate scheduling of a communication event between the user and a second user remote from the apparatus;

receive, from the second apparatus, the availability recommendation of the plurality of time periods in response to the request;

present, on a display device, the availability recommendation of the plurality of time periods in a schedule format;

receive a second input from the user indicating a selection of at least one first time period of the plurality of time periods for scheduling the communication event;

in response to receiving the second input, transmit a request, to the second apparatus, to schedule a communication event between the user and the second user;

determine, by the second apparatus, whether to approve scheduling the communication event between the user and the second user, determining whether to approve scheduling the communication event including determining whether communication events are enabled;

in response to determining to approve scheduling the communication event:
   determine a time period for the communication event and a customer category of at least one user associated with the communication event;
   based on the determined time period and customer category, determine a minimum video quality for the communication event; and
   receive, from the second apparatus, an indication that scheduling of the communication event with the determined video quality is approved.

10. The apparatus of claim 9, wherein the second input comprises communication event information.

11. The apparatus of claim 10, wherein the communication event information comprises a proposed start time and end time for the communication event.

12. The apparatus of claim 10, wherein the memory further stores computer-readable instructions that, when executed by the at least one processor, cause the apparatus to:
   receive real-time communication event availability information; and
   present the real-time communication event availability information to the user.

13. The apparatus of claim 12, wherein the real-time communication event availability information indicates that capacity is available for a real-time communication event, and
   wherein present the real-time communication event availability information to the user comprises:
     present, to the user, an available capacity indicator on a communication event dashboard.

14. One or more non-transitory computer-readable media having computer-executable instructions stored thereon that, when executed, cause at least one computing device to:
   determine, by a first computing device, an availability recommendation for a plurality of time periods for a communication event based on scheduled communication events of other users and bandwidth usage of the other users;
   receive, from a second computing device, a request to initiate scheduling of a communication event between a first user of the second computing device and a second user;
   transmit, to the second computing device, the availability recommendation of the plurality of time periods in response to the request;
   receive, from the second computing device, a request to schedule a communication event between the first user and the second user based on the availability recommendation, the request comprising communication event information;
   determine, by the first computing device, whether to approve scheduling of the communication event between the first user and the second user based on the communication event information and the scheduled communication events of other users, the determining whether to approve scheduling of the communication event including determining whether communication events are enabled;
   in response to determining to approving scheduling of the communication event based on the communication event information;
     determine a time period for the communication event and a customer category of at least one user associated with the communication event;
     based on the determined time period and customer category, determine a minimum video quality for the communication event; and
     provide, to the second computing device, an indication that scheduling of the communication event with the determined video quality is approved.

15. The one or more non-transitory computer-readable media of claim 14, wherein the communication event comprises a video conference between the first user and the second user.

16. The one or more non-transitory computer-readable media of claim 14, wherein the request comprises a request to schedule a communication event at a future time, and
   wherein determine whether to approve scheduling of the communication event further includes:
     determine, by the first computing device, whether to approve scheduling of the communication event based on the communication event information, predicted network conditions, and scheduled communication events of other users.

17. The one or more non-transitory computer-readable media of claim 14, wherein the request comprises a request to schedule a real-time communication event, and
   wherein determine whether to approve scheduling of the communication event further includes:
     determine, by the first computing device, whether to approve scheduling of the communication event at a current time based on one or more currently active communication events and real-time network conditions.

18. The one or more non-transitory computer-readable media of claim 17, wherein determine whether to approve scheduling of the communication event at the current time further includes determining whether to approve scheduling of the communication event at the current time based on the one or more currently active communication events, real-time network conditions, and scheduled communication events starting within a predetermined time window from the current time.

19. The one or more non-transitory computer-readable media of claim 14, wherein determine the availability recommendation comprises:
   for each time period of the plurality of time periods, determining, by the first computing device, the availability recommendation of the time period for a communication event based on at least one of a number of scheduled communication events during a same time period, presence of a maintenance block, and estimated bandwidth usage of scheduled communication events during the same time period.

20. The one or more non-transitory computer-readable media of claim 14, wherein the first user is at a first location, and wherein the scheduled communication events of other users comprise scheduled communication events of other users at the first location.

\* \* \* \* \*